(12) United States Patent
Runcie

(10) Patent No.: US 8,116,439 B1
(45) Date of Patent: Feb. 14, 2012

(54) CALL INTRUSION

(75) Inventor: Peter D. Runcie, Bilgola Plateau (AU)

(73) Assignee: Avaya Inc., Basking Ridge, NJ (US)

( * ) Notice: Subject to any disclaimer, the term of this patent is extended or adjusted under 35 U.S.C. 154(b) by 1496 days.

(21) Appl. No.: 11/207,631

(22) Filed: Aug. 19, 2005

(51) Int. Cl.
*H04M 1/64* (2006.01)
*H04M 3/42* (2006.01)

(52) U.S. Cl. ............... 379/88.12; 379/88.22; 379/201.1

(58) Field of Classification Search ............... 379/88.12, 379/88.22
See application file for complete search history.

(56) References Cited

U.S. PATENT DOCUMENTS

| | | | | |
|---|---|---|---|---|
| 5,373,549 A * | 12/1994 | Bales et al. | ................ | 379/93.21 |
| 5,771,273 A * | 6/1998 | McAllister et al. | ........ | 379/88.01 |
| 5,889,844 A * | 3/1999 | Kim et al. | ................ | 379/202.01 |
| 6,118,861 A * | 9/2000 | Gutzmann et al. | ....... | 379/201.01 |
| 6,275,806 B1 * | 8/2001 | Pertrushin | .................... | 704/272 |
| 6,404,873 B1 * | 6/2002 | Beyda et al. | ............. | 379/202.01 |
| 6,959,079 B2 * | 10/2005 | Elazar | ...................... | 379/265.06 |
| 7,324,636 B2 * | 1/2008 | Sauvage et al. | .......... | 379/201.01 |
| 7,792,901 B2 * | 9/2010 | Beers et al. | .................... | 709/204 |
| 7,877,486 B2 * | 1/2011 | Da Palma et al. | ............. | 709/227 |
| 2002/0077089 A1 * | 6/2002 | Contreras | ..................... | 455/415 |
| 2004/0228463 A1 * | 11/2004 | Sauvage et al. | .......... | 379/202.01 |
| 2005/0147227 A1 * | 7/2005 | Chervirala et al. | ...... | 379/215.01 |
| 2007/0041582 A1 * | 2/2007 | Lam | ............................... | 379/908 |
| 2008/0027643 A1 * | 1/2008 | Basir et al. | ..................... | 701/213 |
| 2008/0267363 A1 * | 10/2008 | Pickett | ............................ | 379/85 |
| 2008/0313050 A1 * | 12/2008 | Basir | ............................... | 705/26 |
| 2009/0131119 A1 * | 5/2009 | Chang et al. | ................... | 455/567 |

OTHER PUBLICATIONS

Buder, E. and Eriksson, A., *Time-Series Analysis of Conversational Prosody for the Identification of Rhythmic Units*, ICPhS99, San Francisco, pp. 1071-1074 (undated).

Ingulfsen, T., *Influence of syntax on prosodic boundary prediction*, University of Cambridge, Computer Laboratory, Technical Report No. 610, UCAM-CL-TR-610, ISSN 1476-2986, pp. 1-49, Dec. 2004.

Sanders, E. and Taylor, P., *Using Statistical Models to Predict Phrase Boundaries for Speech Synthesis*, 4 pages. (undated).

Huang, T. and Turner, K, *Policy Support for H.323 Call Handling*, Computing Science and Mathematics, University of Stirling, Stirling FK9 4LA, UK, pp. 1-22, Dec. 23, 2004.

*ADIX APS System Features*, Chapter 2, pp. 1-36, internet address: http://64.233.167.104/search?q=cache:aPYgXe8DIqoi:www.iwatsu.com/DocLibrary/Gen..., printed Jul. 20, 2005.

* cited by examiner

*Primary Examiner* — Joseph T Phan
(74) *Attorney, Agent, or Firm* — Sheridan Ross P.C.

(57) ABSTRACT

A computational system is provided that includes:
(a) a boundary analyzer 164, 168, and 216 operable to identify a next boundary in a predetermined activity; and
(b) an interrupt handler 160 operable to (i) determine that a notification is to be provided to a user, (ii) determine that the user is currently engaged in the predetermined activity on a computational device, and (iii) provide the notification to the user in temporal proximity to the identified next boundary.

7 Claims, 2 Drawing Sheets

CALL INTRUSION

FIELD

The invention relates generally to telecommunications systems and particularly to call intrusion notifications.

BACKGROUND

A number of features in existing telecommunications facilitate intrusion by one party into a call (or session) between two other parties. Whisper page, for example, allows subscribers to communicate with a busy extension without interrupting a call in progress. When a busy station is called using the whisper page feature, the busy station user will hear the voice announcement and/or tones through the handset receiver. The station using the whisper page can choose to communicate with the calling station by pressing a key, such as the [*] key. Neither the voice of the station sending the whisper page nor the busy station's response is audible to the outside party. Barge-in allows a subscriber to enter an existing conversation without the other party knowing about the conversation. A warning tone is sent to inform the party that a three-way conference has been established. A call waiting feature causes a busy station to emit an audible set of tones to notify the user of an incoming call. The user can place the current call on hold to answer the incoming call. In a multi-party conference call, party entry and exit tones are broadcast over the various bearer channels to the call.

As can be seen from the above, the features can disrupt the call in progress. The disruption ranges from the injection of an audible tone to the complete disruption of the call. Such intrusions act immediately regardless of whether the parties to the intruded call are in mid-sentence. Intrusions can therefore cause misunderstandings, delay the duration of the call, and annoy participants.

SUMMARY

These and other needs are addressed by the various embodiments and configurations of the present invention. The present invention is directed generally to a computational device (e.g., a communications device or a computational component) that times the provision of notification(s) to a user to be in proximity to boundaries in activity.

The notification(s) can be associated with a variety of user messages, such as a whisper page, an operator barge in, an incoming call waiting, a party entry and exit in a conference call, an incoming email, an operating system and/or application notification or message, an incoming call, and an incoming instant message. The notifications can be in many forms, including an audible message (e.g., a voice message or a tone, a voice intonation that is recorded or synthesized by the system and used instead of a tone) and a graphical message, such as an icon.

The activity being interrupted for the notification can be performed by the user or another party. Exemplary activities include voice call with another party, voice message retrieval, and providing user input to an application.

The boundary is a gap or pause in the activity. Exemplary boundaries include a gap between adjacent words, sentences, and phrases in a voice stream (whether spoken by the user or another party) and a pause in user tactile activity.

Waiting to provide user notifications until boundaries occur can substantially minimize the intrusive effects of the notifications on the user and others and reduce user annoyance and inconvenience from the intrusion. In most cases, delaying an intrusion until a boundary occurs does not present a problem. For example, waiting until a speaker has finished their sentence before injecting a whisper page tone or automated announcement generally does not present a problem and can cause less disruption in mid-sentence.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system having a private branch exchange (PBX) or other similar contact processing switch or server, the invention is not limited to use with any particular type of communication system switch or server or configuration of system elements. Those skilled in the art will recognize that the disclosed techniques may be used in any communication application in which it is desirable to provide improved user service. The term "contact" or "call" as used herein is intended to include not only telephone calls but also non-telephonic communications, such as data transmissions such as electronic mail, voice-over-IP, instant messaging, teletypewriter (TTY), facsimile, etc., whether circuit switched or packet switched.

Figure 1:
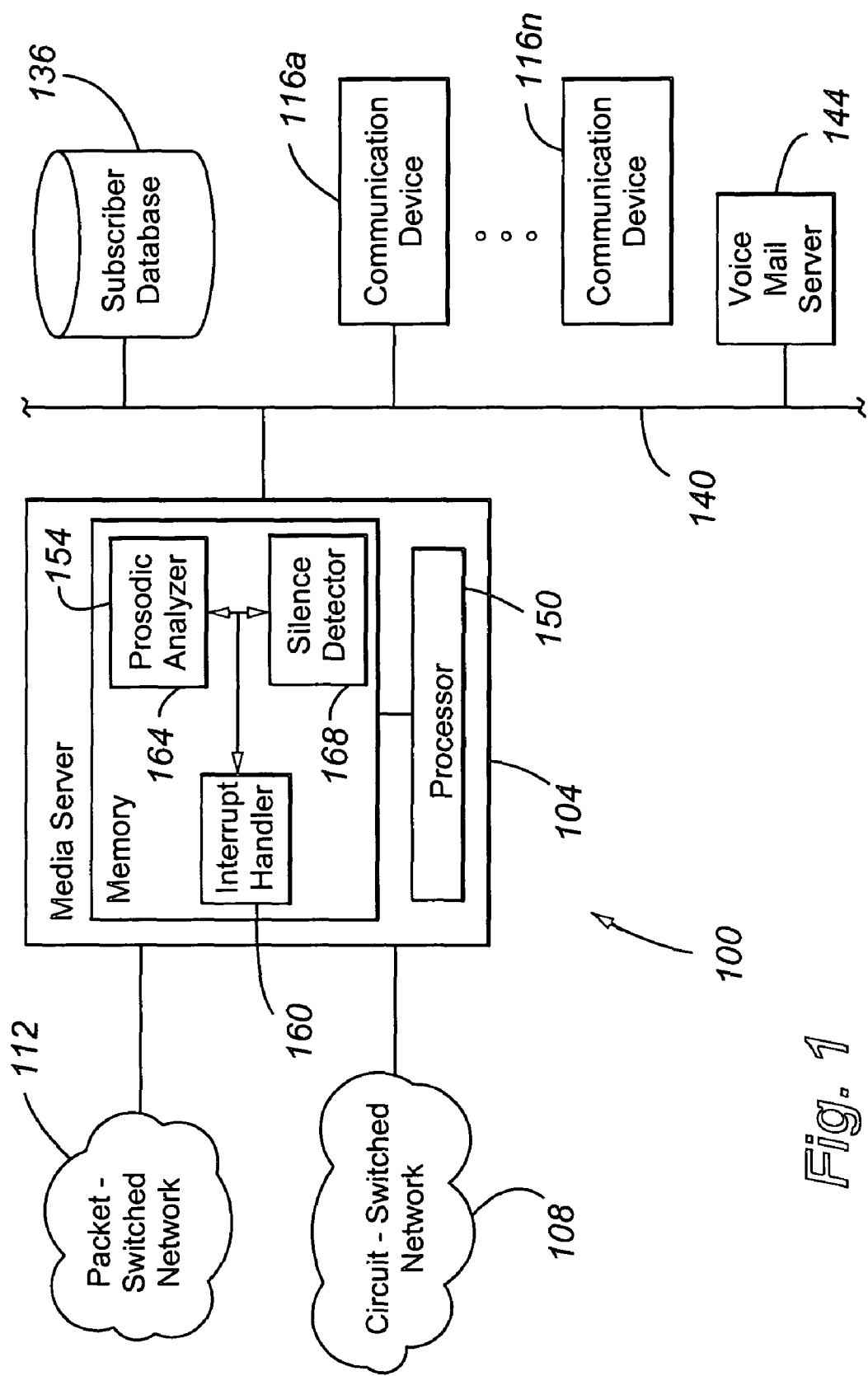
FIG. 1 is a block diagram of an enterprise network according to an embodiment of the present invention.

FIG. 1 shows an exemplary communication architecture 100 in which the invention is implemented. The architecture 100 includes a communication server 104, which is connected to a circuit-switched network 108, such as the Public Switched Telephone Network or PSTN, and a packet-switched network 112, which is commonly a Wide Area Network. The WAN 112, in one configuration, is a data or distributed processing network, such as the Internet, and typically applies the TCP/IP suite of protocols. The WAN 112 can include a number of components, including a plurality of routers to route packets, such as by least cost routing, a plurality of proxy servers to perform contact routing, session management, redirect functions, routing to media gateways, and user authentication, and a plurality of presence servers to provide subscriber domain names or locations, subscriber profiles and registration, and other subscriber-related presence and availability information. The server 104 is connected to and serves a number of packet-switched or circuit-switched communication devices 116a . . . n that are registered with the communication server 104, respectively. "Registration" is a process by which a communication device is made known to a server. As will be appreciated, the registration can be performed by any technique or according to any protocol (e.g., such as H.323, SIP, 802.11, ReSerVation Protocol or RSVP, digital port initialization, and the like) and may by effected by the system administrator and/or through another suitable manual or automated technique.

The communication (or computational) devices 116 optionally include a display device, such as a computer monitor or LCD display. Each of the communication devices 116 may be wired desktop telephone terminals or any other type of wired or wireless device capable of communicating with the switch/server. The word "communication device" as used herein should therefore be understood to include not only wired or wireless desktop telephone terminals but also other types of processor-based communication devices, including without limitation mobile telephones, IP telephones, IP softphones, IP hardphones, personal computers, laptop computers, personal digital assistants (PDAs).

The communication server serves the enterprise network and is in communication with a separate subscriber database 136 that include a variety of information, including server and device configuration information, device capabilities/requirements, and subscriber information, such as subscriber identity, and the like.

The enterprise network further includes a Local Area Network or LAN 140 and a voice mail server 144. The LAN 140 can be a circuit-switched or packet-switched network. The voice mail server 144 receives and stores voice messages for each enterprise subscriber.

The term "communication server" as used herein should be understood to include a PBX, an enterprise switch, or other type of telecommunications system switch or server, as well as other types of processor-based communication control devices such as computers, adjuncts, etc. The server enables communications to be forwarded across the networks 108 and 112 according to a packet data protocol, such as the Voice over Internet Protocol or VoIP or some other Real Time Protocol (RTP), H.323, SIP, Differentiated Services or Diffsery Protocol, RSVP, and the like or a circuit-switched protocol, such as ISDN. In an exemplary embodiment the communication server may be implemented as an otherwise conventional Definity™ or Multivantage™ Enterprise Communication Service (ECS)™ communication system or Avaya Communication Manager™ switch available from Avaya Inc. Other types of known switches/servers are well known in the art and therefore not described in detail herein.

The communication server receives incoming and outgoing contacts from the networks 108 and 112 for processing. Typically, the networks or other transit networks between the user's communication device and the communication server and between the communication server and another external communication server or communication device are configured such that the server receives not only the intended destination address but also the source address or identity of the communication device initiating the contact.

It should be noted that the invention does not require any particular type of information transport medium between the servers and the communication devices or between the servers, i.e., the invention may be implemented with any desired type of transport medium as well as combinations of different types of transport media and with any desired type of network connection.

The server is preferably a software-controlled device including a processor 150 and memory 154. The processor 150 generally operates to execute instructions, for example stored in the associated memory 154 or memory integral to the processor 150. Accordingly, the processor may include a general purpose programmable processor, Digital Signal Processor or DSP, or controller. The processor may implement functions represented by the user interrupt handler 160 described below.

The memory 154 may store instructions, such as those represented by the call interrupt handler 160, prosodic analyzer 164, and silence analyzer 168, for controlling operation of the processor. The memory may include any data storage device, such as a solid state memory, a hard disk drive, or read only memory. As will be appreciated, the processor and memory may be implemented as an integrated controller-type device. The server may include additional elements that are omitted from FIG. 1 for simplicity and clarity of illustration. For example, the server may include an external database to store system configuration information, a gateway, a gatekeeper, a multipoint control unit, a registrar, a proxy server, a redirect server, service circuits such as tone generators, announcement circuits, etc., and a port card for each type of user communication device associated therewith. Also associated with the server may be an administrator terminal (not shown) which is used to program the operation of the switch/server during system administration, e.g., an initial set-up and configuration of the system of a subsequent system-level or user-level configuration. Other devices not shown in the figures may be associated with the server, such as an adjunct feature server. Such an adjunct server may be physically incorporated within the server and may be partially or completely implemented using other server elements such as the processor 150 and memory 154.

It should be emphasized that the configuration of the servers, communication devices, and other elements as shown in FIG. 1 is for purposes of illustration only and should not be construed as limiting the invention to any particular arrangement of elements.

The interrupt handler 160, prosodic analyzer 164, and silence analyzer 168 collaboratively introduce tones and/or voice notifications at speech boundaries to reduce disruption to the parties on the call being interrupted. As will be appreciated, a "speech boundary" may be an inter-word, inter-phrase, and/or inter-sentence gap or break. The tones and/or voice notifications are associated with telecommunication features, such as whisper page, operator barge in, incoming call waiting, and/or party entry and exit tones in conference calls. The interrupt handler 160 is notified by the prosodic analyzer 164 or silence analyzer 168 when a speech boundary is encountered or is likely to be encountered, and the interrupt handler 160 instructs the tone generator circuit (not shown) at what time to play the desired tones over one or more of the bearer channels of the voice communication. Preferably, the tones are played in temporal proximity to a speech boundary. Even more preferably, the tones are played in gaps in speech so that the tones do not overlap or minimally overlap speech of a party to the interrupted call.

The prosodic analyzer 164 identifies the temporal locations of probable prosodic boundaries in the voice stream, typically using speech rhythms. The analyzer 164 preferably performs a syntactic parse of the voice stream and then manipulates the structure to produce a prosodic parse. Parse strategies include without limitation triagram probabilities (in which every triagram in a sentence is considered and a boundary is placed when the probability is over a certain threshold). Other techniques may be employed, such as the annotation of text with part-of-speech via supertags, parse trees and prosodic boundaries and the consideration not only of triagram probabilities but also distance probability as discussed in *Using Statistical*

*Models to Predict Phrase Boundaries for Speech Synthesis* by Sanders, et al., Nijmegan University and Centre for Speech Technology Research, University of Edinburgh, and syntactic chunks to link grammar, dependency trees, and syntactic constituents as discussed in *Influence of Syntax on Prosodic Boundary Prediction*, to Ingulfsen, University of Cambridge, Technical Report No. 610 (December 2004), each of which is incorporated herein by this reference.

The silence analyzer 168 identifies an interval of nonspeech (or nonvoice), such as background noise and silence, in the voice stream. The silence analyzer 168 may be any suitable silence detection background noise and device. Typically, silence detection devices identify nonspeech or silence based on the magnitude and/or frequency spectrum of sound energy detected over a selected interval.

There are at least two configurations in this embodiment.

First, a subscriber is on a call with another party and the server 104 desires to play a call interrupt tone or recorded announcement over one or more of the bearer channels of the conversation. The interrupt handler 160 queries the prosodic analyzer 164 for a likely next speech boundary in the voice stream. The next speech boundary is preferably a speech boundary represented by the end of a sentence as an inter-sentence gap is commonly long enough for the tones to be played before a next sentence begins. The prosodic analyzer 164 is preferably in operation throughout the duration of each inter-party call handled by the server, whether the call is between subscribers or between a subscriber and a third party (nonsubscriber). In other words, a prosodic analyzer 164 is attached to each incoming and outgoing call before or immediately after the call is answered. In response, the prosodic analyzer 164 notifies the interrupt handler 160 of the timing of the next (likely) (inter-sentence) speech boundary. The interrupt handler 160 commands the tone generator to generate the tones at or immediately after the time of the next (likely) speech boundary.

Second, a subscriber has called the voice mail server 144 and is in the middle of listening to voice messages. The server 104 desires to play a call interrupt tone over the listening channel of the conversation. The interrupt handler 160 queries the silence analyzer 168 for a gap in the conversation. The silence analyzer 168 detects or has detected silence in the voice stream, which may represent a speech boundary (such as an inter-word, inter-phrase, or inter-sentence boundary) or may represent a period of command generation by the user (such as the user going through a voice mail command menu). When silence is detected, the voice stream is buffered while the interrupt handler 160 instructs the tone generator to generate the desired tones. When the tones have been played, transmission of the voice stream to the subscriber is resumed. In an alternative configuration, boundaries in the recorded voice stream are flagged at a point before message playback so that the handler 160 simply needs to identify the position of the next flag for transmission of the tone(s). In this configuration, the silence analyzer has analyzed the voice stream during or after recording onto the storage medium.

Figure 2:
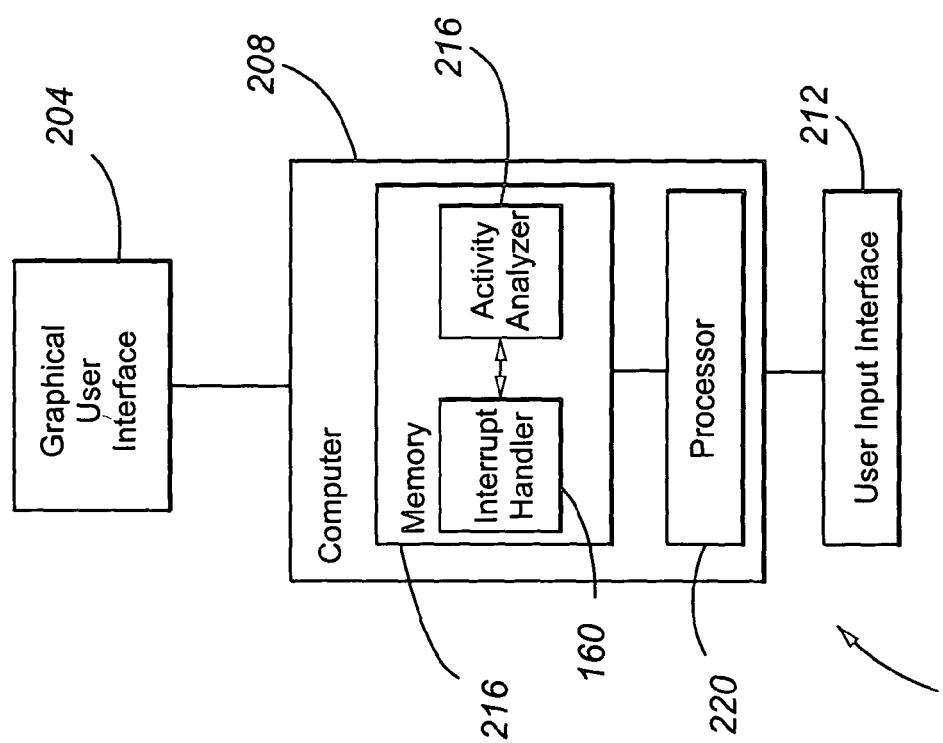
FIG. 2 is a block diagram of a computational component according to an embodiment of the present invention.

FIG. 2 depicts a computational component according to another embodiment. The component 200 includes a graphical user interface 204, a computer 208, and a user input interface 212. The Graphical User Interface 204 or GUI is typically a monitor but can be any type of GUI. The computer 208 includes a memory 216 and processor 220. The interrupt handler 160 and an activity analyzer 216 are included in memory 216. The user input interface 204 can be any tactile and/or audio command interface, such as a keyboard, a mouse, a stylus, a microphone, and the like. By way of illustration, the component 200 may be configured as a workstation, a Personal Computer or PC, a PDA (Personal Digital Assistant) or a laptop.

The interrupt handler 160 receives temporary graphical images or notifications that are to be displayed on the GUI 204 simultaneously with content selected by the user. Temporary notifications are typically of limited temporal duration. Examples of temporary graphical images include email notifications, popup messages or dialog boxes, operating system and/or application notifications and/or messages, incoming call notifications, incoming instant message notifications, and the like. The notification may be from the operating system, the application which the user is currently using, or from another application. For example, a user can be working in a word processing application and receive an incoming email or instant message notification from an email or instant message application. When the interrupt handler receives a notification that is to be displayed, the handler queries the activity analyzer 216 to determine if the user is inputting additional content into the GUI 204. As in the case of the prior embodiment, the handler desires to display the notifications during a break in user activity to avoid loss of content, such as loss of keystrokes or a tactile or voice command. The activity analyzer 216, which is always in operation when the computer is activated, seeks to identify an actual or likely pause of a specified minimum duration in user activity (or activity boundary) during which the notification may be displayed on the GUI. For example, the activity analyzer 216 seeks to locate a pause between keystrokes or spoken commands having a duration of at least 0.1 seconds. To the extent tactile commands are being received from the user, the activity analyzer can monitor keyboard, mouse or stylus activity for such pauses. To the extent audio commands are being received from the user, the pause can be determined by prosodic analysis or silence detection. When such a pause is identified, the analyzer 216 notifies the handler 160, which in turn permits the notification to be displayed on the GUI 204 in temporal proximity to the boundary. In one application, if multiple identical notifications arrive while the handler 160 is awaiting a pause they are buffered by the handler 160. When a pause is located, all of the notifications are displayed in different non-overlapping areas of the GUI at the same time. In one configuration, a counter is displayed on the notification to indicate the number of notifications received while waiting for a pause. For example, if three email messages arrive while the handler 160 is waiting for an activity boundary, the various notifications for each email can be combined into a single notification such as "You have received three new emails from johnsmith@aol.com, marysmith@xyz.com, and johnhancock@att.net".

Figure 3:
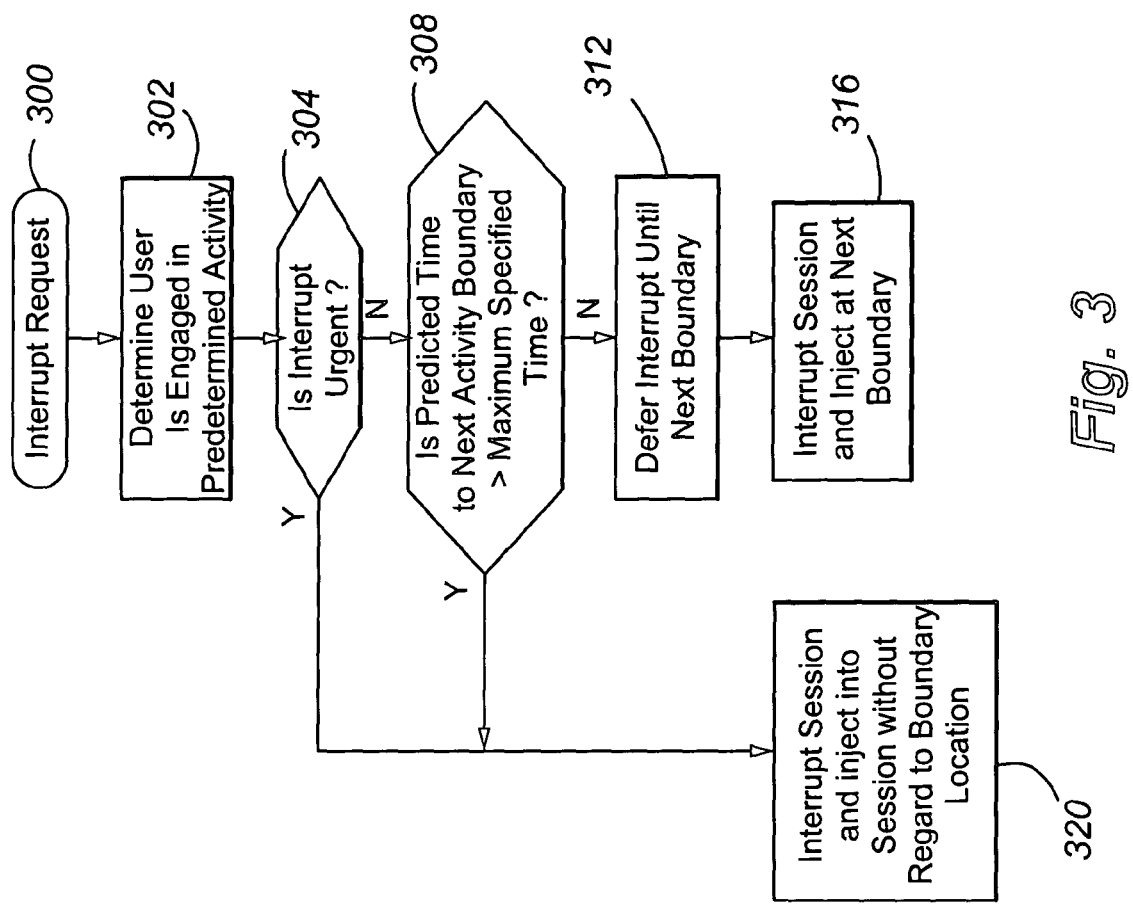
FIG. 3 is a flow chart of an operational embodiment of an intrusion handler according to an embodiment of the present invention.

An operational embodiment of the handler will now be discussed with reference to FIG. 3.

The operation starts when the handler 160 receives an interrupt request 300 associated with a call intrusion or GUI notification and determines in step 302 that the user is involved in a predetermined type of activity. For example, the activity could be a voice call, retrieval of a voice message, providing a voice command to a computational component, typing input to a computational component, providing input to the computational component using a mouse or stylus, and the like.

In response, the handler 160 in decision diamond 304 determines if the interrupt is urgent. Urgency may be determined by the type of notification or call and/or configured by the user. For example, the user may authorize calls from certain parties as being urgent. Alternatively, the computer

208 may elevate a notification to urgent if it involves a potential fault or malfunction of the computer.

When the interrupt request is not urgent, the handler in decision diamond 308 determines whether the predicted time to the next activity boundary (whether speech or user command) is greater than a specified time. For example, a timer of 10 seconds can be used. In one configuration, the decision diamond determines whether a pause or gap of a specified minimum duration has been identified within the specified time. In another configuration, the decision diamond whether a pause or gap of any duration has been identified within the specified time.

If the answer to decision diamond 308 is "no", the handler in step 312 defers the interrupt until the next boundary occurs and, when the boundary is encountered, in step 316 interrupts the session (whether a call, voice mail retrieval session, or computer work session) and injects or introduces the interrupt signal(s), whether intrusion tones or graphical notifications, at the gap or boundary.

If the answer to decision diamonds 304 or 308 is "yes", the handler in step 320 interrupts the session without regard to the boundary location.

A number of variations and modifications of the invention can be used. It would be possible to provide for some features of the invention without providing others. For example in one alternative embodiment, the agent is implemented as software, hardware (such as an logic circuit or ASIC), or a combination of the two.

In another alternative embodiment, one or more of the handler 160, prosodic analyzer 164 and silence analyzer 168 are located in the communication device 116.

In yet another alternative embodiment, the silence analyzer 168 is located in the voice mail server 144 to more effectively analyze recorded voice messages for boundaries.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing a notification to a user, comprising:
   determining that a notification is to be provided to a user by a server at a monitored endpoint, the determination being based on the server receiving an interrupt request associated with a call intrusion or GUI (Graphical User Interface) notification;
   determining that the user is currently engaged in a predetermined activity on a computational device at the monitored endpoint;
   identifying a next boundary in the predetermined activity in which to provide the notification to the user; and
   providing the notification to the user at the monitored endpoint in temporal proximity to the identified next boundary, wherein:
   the predetermined activity is providing user input to an application,
   the notification is a graphical icon,
   the computational device is a computational component,
   the next boundary is a pause in a user activity,
   the user input is at least one of typing on a keyboard, inputting voice commands, inputting commands using a stylus, and inputting commands using a mouse; and
   the identifying step further comprises:
   identifying a pause of at least a predetermined duration, wherein the identified next boundary is the identified pause.

2. The method of claim 1, wherein the notification is associated with at least one of an incoming email, an operating system and/or application warning, an incoming call, and an incoming instant message.

3. The method of claim 1,
   wherein when the notification is urgent providing the notification immediately to user.

4. The method of claim 1, further comprising:
   determining a time to the next boundary;
   when the time to the next boundary is more than a selected duration, providing the notification immediately to user.

5. A non-transitory computer readable medium comprising processor executable instructions for performing the steps of claim 1.

6. A computational system, comprising:
   (a) a boundary analyzer operable to identify a next boundary in a predetermined activity at a monitored endpoint; and
   (b) an interrupt handler operable to (i) determine that a notification is to be provided to a user at the monitored endpoint, the determination being based on a server receiving an interrupt request associated with a call intrusion or GUI (Graphical User Interface) notification, (ii) determine that the user is currently engaged in the predetermined activity on a computational device at the monitored endpoint, and (iii) provide the notification to the user in temporal proximity to the identified next boundary, wherein:
the predetermined activity is providing user input to an application, wherein the notification is a graphical icon, wherein the computational device is a computational component, and wherein the next boundary is a pause in a user activity,
the user activity is at least one of typing on a keyboard, inputting voice commands, inputting commands using a stylus, and inputting commands using a mouse, wherein, in the identifying operation, the boundary analyzer identifies a pause of at least a predetermined duration, and wherein the identified boundary is the identified pause, and
the notification is associated with at least one of an incoming email, an operating system and/or application warning, an incoming call, and an incoming instant message.

7. The computational system of claim 6, wherein the interrupt handler is further operable to (iv) determine a time to the next boundary, and (v) when the time to the next boundary is more than a selected duration, provide the notification immediately to user.

* * * * *